US010209754B2

(12) United States Patent
Kaechi

(10) Patent No.: US 10,209,754 B2
(45) Date of Patent: Feb. 19, 2019

(54) COMMUNICATION APPARATUS, CONTROL METHOD FOR SAME, AND STORAGE MEDIUM

(71) Applicant: CANON KABUSHIKI KAISHA, Tokyo (JP)

(72) Inventor: Shuya Kaechi, Hashimoto (JP)

(73) Assignee: Canon Kabushiki Kaisha, Tokyo (JP)

( * ) Notice: Subject to any disclaimer, the term of this patent is extended or adjusted under 35 U.S.C. 154(b) by 136 days.

(21) Appl. No.: 15/410,051

(22) Filed: Jan. 19, 2017

(65) Prior Publication Data
US 2017/0212566 A1 Jul. 27, 2017

(30) Foreign Application Priority Data

Jan. 21, 2016 (JP) .................................. 2016-009981

(51) Int. Cl.
G06F 1/26 (2006.01)
G06F 1/24 (2006.01)
H04W 4/80 (2018.01)
H04W 4/00 (2018.01)

(52) U.S. Cl.
CPC .................. G06F 1/26 (2013.01); G06F 1/24 (2013.01); H04W 4/00 (2013.01); H04W 4/80 (2018.02)

(58) Field of Classification Search
CPC .. G06F 1/26; G06F 1/24; H04W 4/80; H04W 4/00
See application file for complete search history.

(56) References Cited

U.S. PATENT DOCUMENTS 5,983,362 A * 11/1999 Yasunaga ................ H04L 12/12
714/23
7,421,291 B2 * 9/2008 Karaoguz ............ H04B 1/1615
455/574
9,673,869 B2 * 6/2017 Inoue .................... H04B 5/0037
2010/0095144 A1 * 4/2010 Yamanaka ............ G06F 1/3228
713/323

FOREIGN PATENT DOCUMENTS

JP 2013-157736 A 8/2013

* cited by examiner

Primary Examiner — Stefan Stoynov
(74) Attorney, Agent, or Firm — Cowan, Liebowitz & Latman, P.C.

(57) ABSTRACT

A communication apparatus comprises: a power supply; a communication unit configured to operate by using power from the power supply or a communication partner; an operation unit; a control unit configured to execute software for controlling processing of each unit of the communication apparatus, wherein the control unit starts processing to stop execution of the software if an operation to the operation unit is started while the control unit is executing the software; a power supply control unit configured to control power that is supplied to the control unit, in accordance with a state of as operation with respect to the operation unit; and a disabling unit configured to disable the communication unit, based on the state of the operation with respect to the operation unit and an execution state of the software.

11 Claims, 10 Drawing Sheets

FIG. 2

| HARDWARE ACTIVATION SIGNAL HW_LATCH | SOFTWARE ACTIVATION SIGNAL SW_LATCH OR CONTACTLESS IC ENABLE SIGNAL RF_EN_OUT3 | RF_EN | VOUT_A | OPERATION OF CLOSE PROXIMITY WIRELESS COMMUNICATION BY CONTACTLESS IC |
|---|---|---|---|---|
| L | L | H | L | DISABLE |
| L | H | INHIBIT | L | - |
| H | L | L | H | DISABLE |
| H | H | H | H | ENABLE |

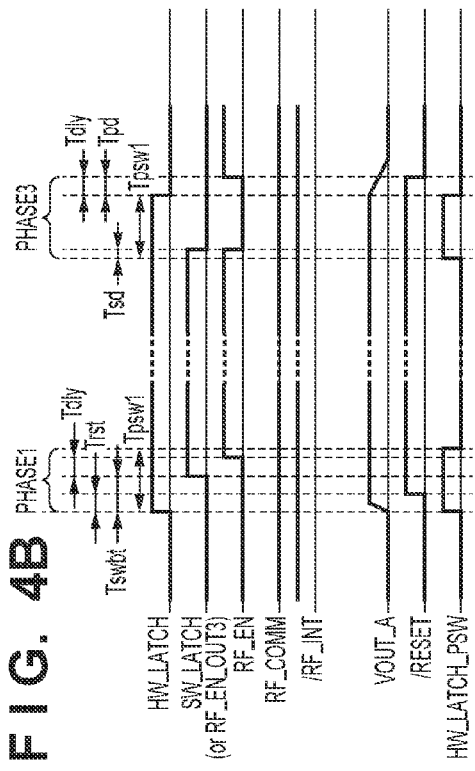
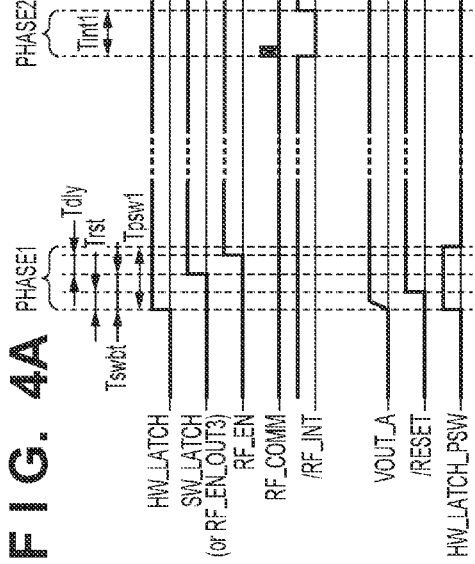
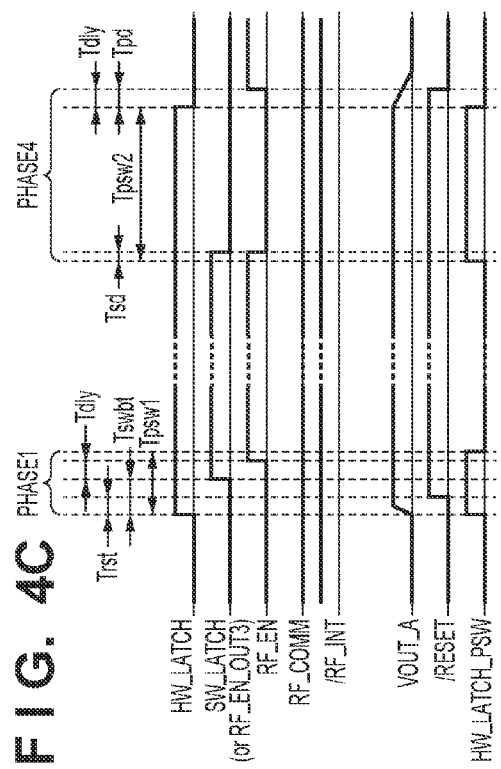

FIG. 6

| VOLTAGE DETECTION CIRCUIT SIGNAL VDET_OUT | HARDWARE ACTIVATION ONE-SHOT SIGNAL HW_LATCH_OS | HARDWARE ACTIVATION SIGNAL HW_LATCH | SOFTWARE ACTIVATION SIGNAL SW_LATCH OR CONTACTLESS IC ENABLE SIGNAL RF_EN_OUT3 | RF_EN | OPERATION OF CLOSE PROXIMITY WIRELESS COMMUNICATION BY CONTACTLESS IC |
|---|---|---|---|---|---|
| L | L | L | L | L | DISABLE |
| L | L | L | H | INHIBIT | - |
| L | L | H | L | L | DISABLE |
| L | L | H | H | H | ENABLE |
| L | H | L | L | INHIBIT | - |
| L | H | L | H | INHIBIT | - |
| L | H | H | L | H | ENABLE |
| L | H | H | H | INHIBIT | - |
| H | L | L | L | H | ENABLE |
| H | L | L | H | INHIBIT | - |
| H | L | H | L | L | DISABLE |
| H | L | H | H | H | ENABLE |
| H | H | L | L | INHIBIT | - |
| H | H | L | H | INHIBIT | - |
| H | H | H | L | H | ENABLE |
| H | H | H | H | INHIBIT | - |

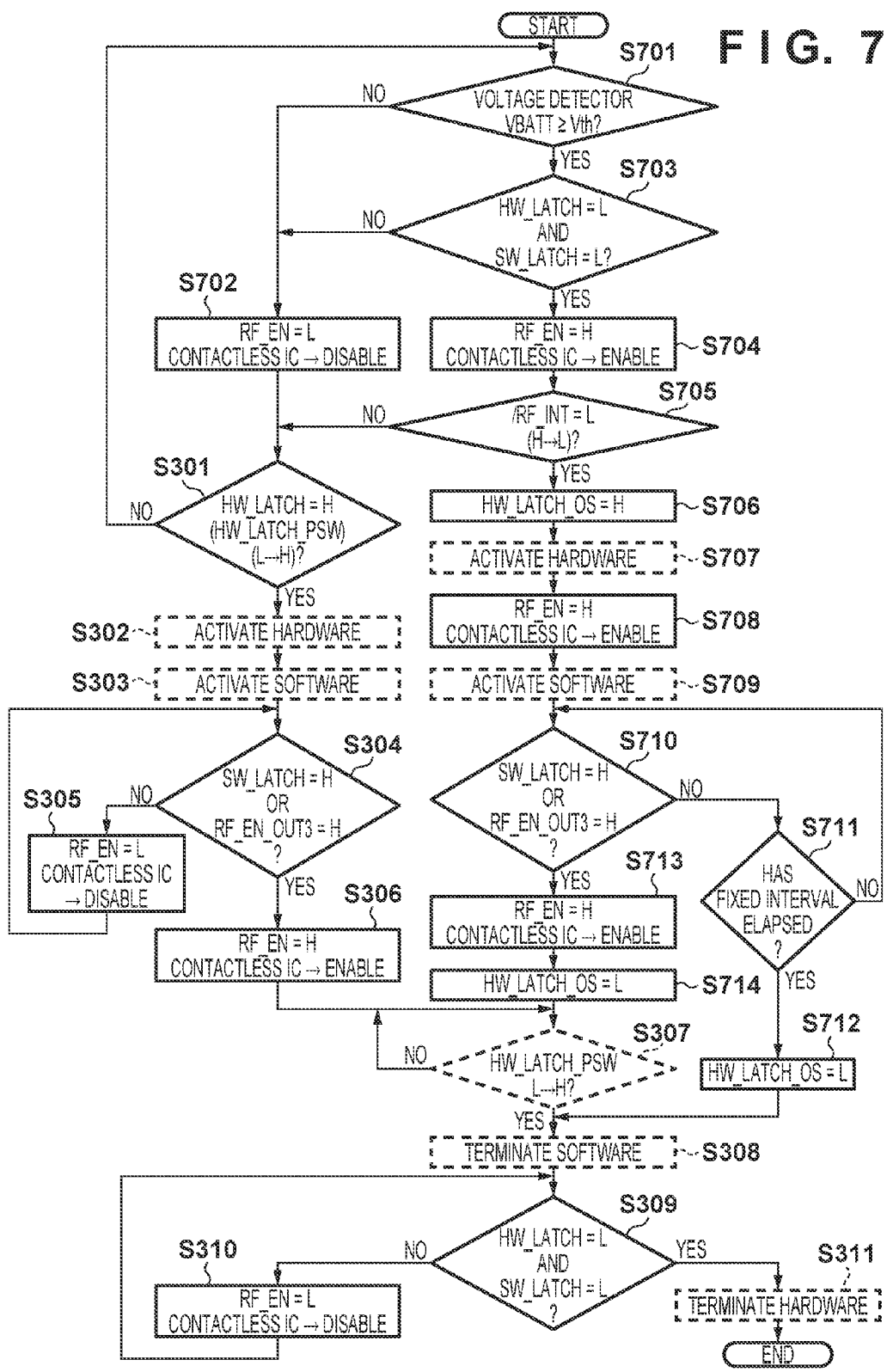

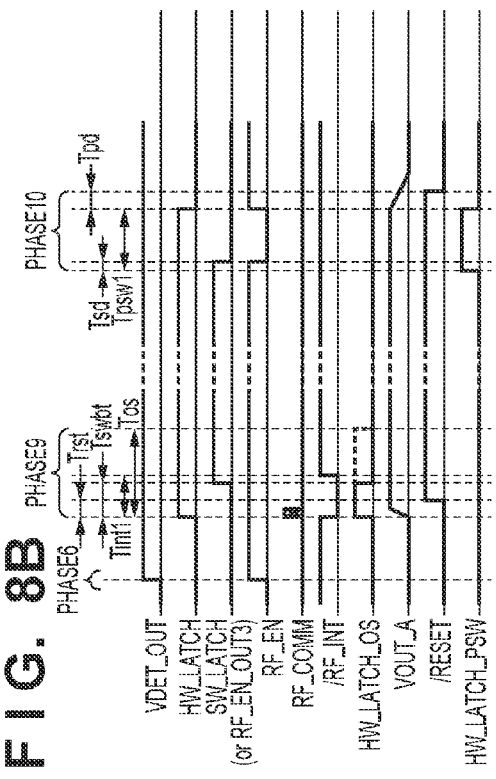
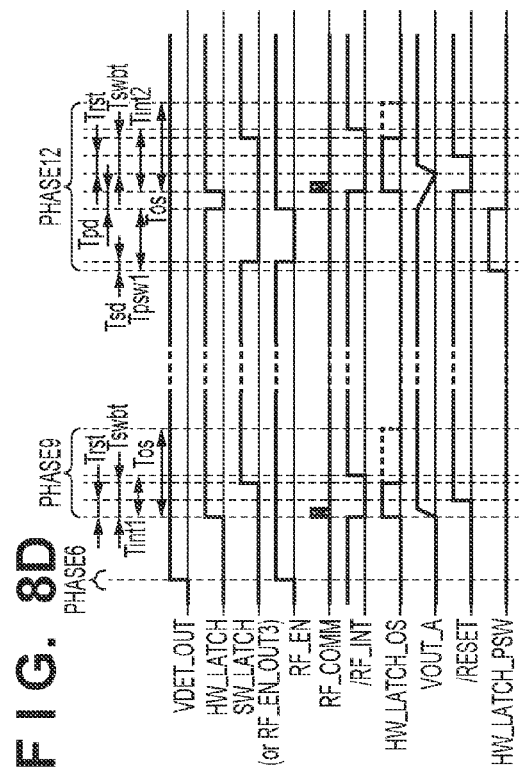
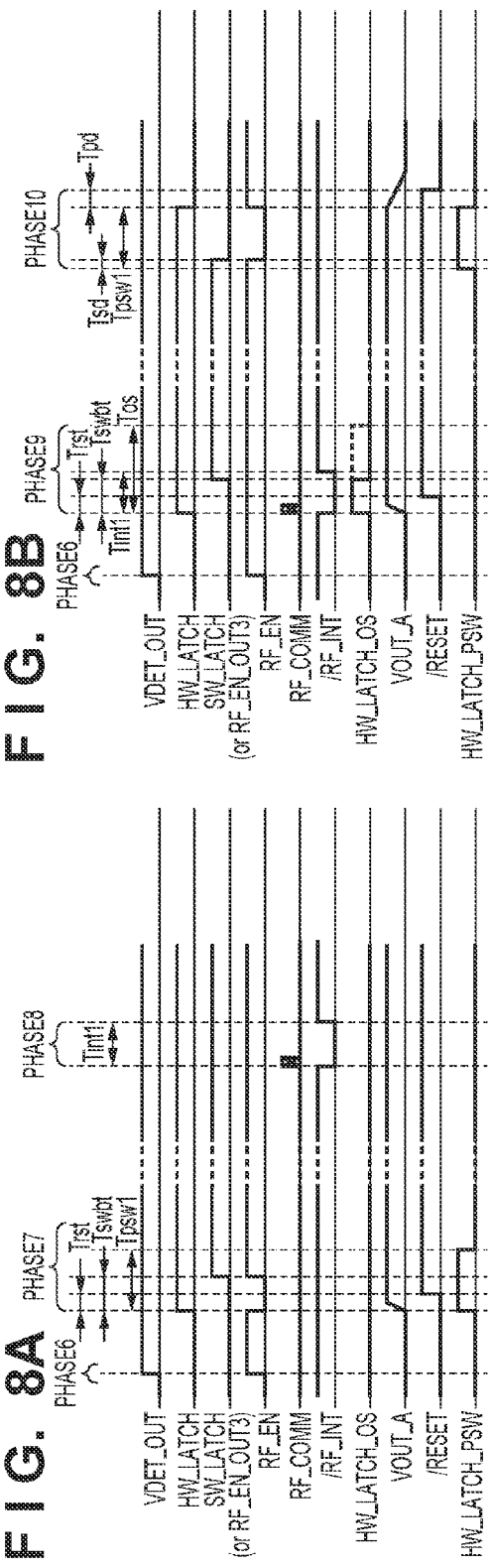
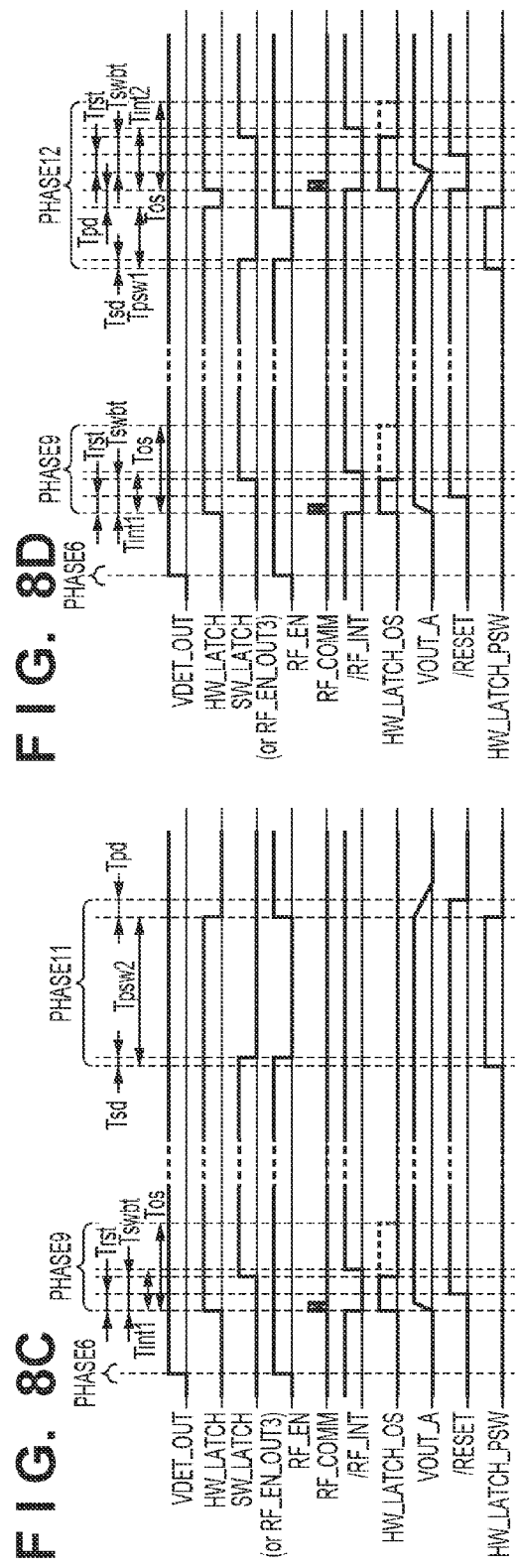

COMMUNICATION APPARATUS, CONTROL METHOD FOR SAME, AND STORAGE MEDIUM

BACKGROUND OF THE INVENTION

Field of the Invention

The present invention relates to a communication apparatus, a control method for same, and a storage medium.

Description of the Related Art

In recent years, a so-called handover technique in which a communication apparatus uses close proximity wireless communication to share a setting for wireless communication and make it easy to start wireless communication is known. Japanese Patent Laid-Open No. 2013-157736 discloses a system for easily establishing wireless LAN connection, in which NFC (Near Field Communication) is used to share communication parameters (SSID and password) necessary for a wireless LAN connection between apparatuses.

Such a system that uses wireless communication is, for example, configured from a communication apparatus (for example a digital camera) equipped with a contactless IC tag (hereinafter referred to simply as a contactless IC) and a communication apparatus (for example a smart phone) equipped with a reader/writer for communicating with the contactless IC. Because the contactless IC has an internal memory that can store data, a reader/writer apparatus can perform reading or writing of data stored in the internal memory after approaching the contactless IC. In addition, the contactless IC can communicate in accordance with power caused to be generated by using magnetic flux that the reader/writer apparatus causes to be generated. Accordingly, the reader/writer apparatus can perform writing or reading of data with respect to the contactless IC, even if a power supply of the communication apparatus in which the contactless IC is equipped is in an OFF state.

Incidentally, in a communication apparatus equipped with a contactless IC, it is possible to start wireless communication without a user operation when another communication apparatus being close is detected, and as mentioned above, it is also possible to perform wireless communication even when the power supply of the communication apparatus in which the contactless IC is equipped is OFF. Accordingly, there is a case in which wireless communication is started when close proximity between communication apparatuses occurs, irrespective of an intention of a communication apparatus user. Therefore, in a case where the communication apparatus performs predetermined interlink processing that is triggered by wireless communication, there is a possibility that activation of hardware of the communication apparatus due to close proximity and termination of hardware or software that is being executed are contentious, and are not appropriately executed.

SUMMARY OF THE INVENTION

The present invention has been made in consideration of the aforementioned problems, and realizes a technique capable of preventing contention of operation states of hardware and software of a communication apparatus when performing contactless wireless communication.

In order to solve the aforementioned problems, one aspect of the present invention provide a communication apparatus comprising: a power supply; a communication unit configured to operate by using power from the power supply or a communication partner; an operation unit; a control unit configured to execute software for controlling processing of each unit of the communication apparatus, wherein the control unit starts processing to stop execution of the software if an operation to the operation unit is started while the control unit is executing the software; a power supply control unit configured to control power that is supplied to the control unit, in accordance with a state of an operation with respect to the operation unit; and a disabling unit configured to disable the communication unit, based on the state of the operation with respect to the operation unit and an execution state of the software.

Another aspect of the present invention provides a control method of a communication apparatus which comprises a power supply, a communication unit that operates by using power from the power supply or a communication partner, a control unit and an operation unit, the control method comprising: performing, by the control unit, for executing software for controlling processing of each unit of the communication apparatus, wherein the performing starts processing to stop execution of the software if an operation to the operation unit is started while the software is being executed; controlling power for supplying to the control unit, in accordance with a state of an operation with respect to the operation unit; and disabling the communication unit, based on the state of the operation with respect to the operation unit and an execution state of the software.

Still another aspect of the present invention provides a non-transitory computer-readable storage medium storing a program for causing a computer to execute a control method of a communication apparatus which comprises a power supply, a communication unit that operates by using power from the power supply or a communication partner, a control unit, and an operation unit, the control method comprising: performing, by the control unit, for executing software for controlling processing of each unit of the communication apparatus, wherein the performing starts processing to stop execution of the software if an operation to the operation unit is started while the software is being executed; controlling power for supplying to the control unit, in accordance with a state of an operation with respect to the operation unit; and disabling the communication unit, based on the state of the operation with respect to the operation unit and an execution state of the software.

According to the present invention, it becomes possible to prevent contention of operation states of hardware and software of a communication apparatus when performing contactless wireless communication.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

FIG. 2 is a truth table illustrating states of a circuit 171 for controlling a contactless IC 102 of the digital camera 101 according to a first embodiment, and wireless communication operations of the contactless IC 102.

FIGS. 4A-4C are timing charts illustrating a signal control procedure of the circuit 171 for controlling the contactless IC 102 of the digital camera 101 according to the first embodiment.

FIG. 6 is a truth table illustrating states of a circuit 571 for controlling a contactless IC 502 of the digital camera 501 according to a second embodiment, and wireless communication operations of the contactless IC 502.

FIG. 7 is a flowchart illustrating a control procedure of the contactless IC 502 of the digital camera 501 according to the second embodiment.

FIGS. 8A-8D are timing charts illustrating a signal control procedure of the circuit 571 for controlling the contactless IC 502 of the digital camera 501 according to the second embodiment.

DESCRIPTION OF THE EMBODIMENTS (First Embodiment)

Exemplary embodiments of the present invention will be explained hereinafter in detail, with reference to the drawings. Note that, description is given below of an example of using a digital camera capable of close proximity wireless communication as an example of a communication apparatus. However, the present embodiment is not limited to a digital camera, and can also be applied to any device capable of close proximity wireless communication. These devices may include, for example, a mobile telephone terminal, a tablet terminal, a game device, a personal computer, a watch-type or glasses-type information terminal, a medical device, or the like.

(Overview Description)

In the present embodiment, a communication apparatus equipped with a contactless IC (for example, a digital camera) can be triggered by wireless communication to execute interlink processing even in a case in which a power supply thereof is OFF. Accordingly, there is a case in which wireless communication is started when close proximity between communication apparatuses occurs, irrespective of an intention of a user of the communication apparatuses.

For example, the communication apparatus is configured so that, triggered by wireless communication due to a close proximity, it turns the power supply ON and starts execution of predetermined interlink processing. Here, when executing processing to turn the power supply of the communication apparatus OFF due to a user operation, there may be a case in which wireless communication occurs due to close proximity with a reader/writer apparatus. In such a case, there may be a case in which there is contention in the communication apparatus between software shutdown processing started by the user operation and processing for turning the power supply of the hardware ON that is triggered by the wireless communication due to the close proximity. As a result thereof, for example, it is conceivable that a state may be entered in which, while software is shutdown and a screen or the like disappears, other hardware is activated, thereby a battery of the communication apparatus is consumed without a user realizing.

Therefore, the digital camera 101 according to the present embodiment disables contactless wireless communication in accordance with a difference between an activation state (an activated state or a terminated state) of hardware and an activation state of software. Because of this, it becomes possible to prevent contention of software and hardware operation states of the digital camera 101 when performing contactless wireless communication.

(Configuration of Digital Camera 101)

Figure 1:
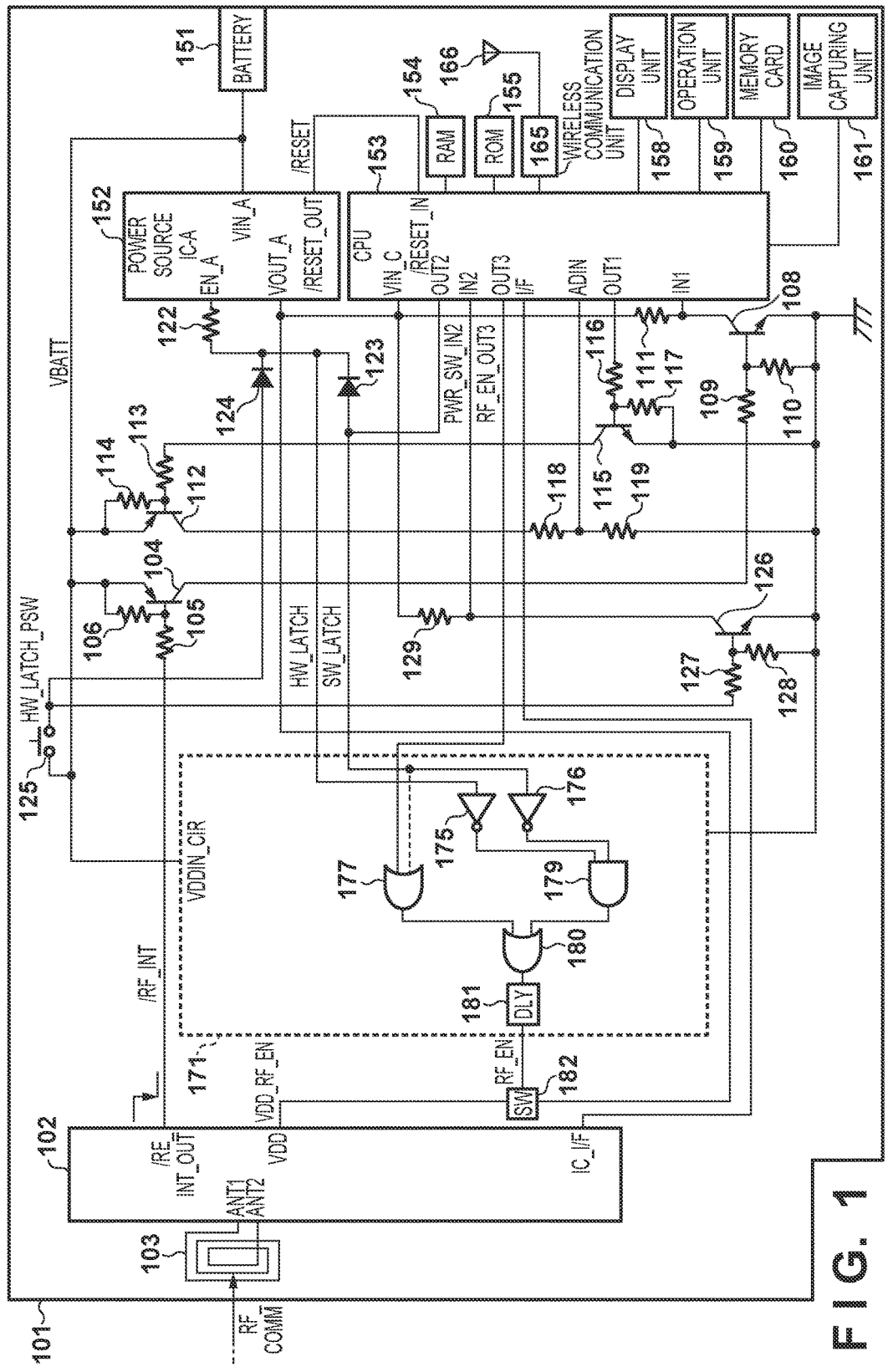
FIG. 1 is a block diagram illustrating an example of a functional configuration of a digital camera 101 as an example of a communication apparatus according to an embodiment of the present invention.

FIG. 1 is a block diagram illustrating (in particular, illustrating in detail a configuration for controlling the contactless IC 102) an example of a functional configuration of the digital camera 101 as an example of a communication apparatus of the present embodiment. Note that one or more circuit arrangements or functional blocks illustrated in FIG. 1 may be realized by hardware such as an ASIC or a programmable logic array (PLA), or may be realized by a programmable processor such as an MPU or a CPU executing software. Also, these may be realized by a combination of software and hardware. Therefore, in the following description, even in cases when different functional blocks are recited as agents of actions, the same hardware can be realized as the agent.

In the present embodiment, a power supply for causing the IC in the contactless IC 102 to operate is configured to be supplied by wire. Note that, in the present embodiment, wireless communication of the contactless IC is assumed to support ISO/IEC 21481 which is an international standard. In addition, in the block diagram used in the following description, recitation of a power supply connection to a block that is unnecessary for the description of the present embodiment is omitted.

An antenna 103 is an antenna for close proximity wireless communication that is connected to the contactless IC 102. When a power supply VDD is supplied to the contactless IC 102, the contactless IC 102 receives by the antenna 103 an electromagnetic wave from a communication apparatus provided with a contactless IC reader/writer (simply referred to as a communication apparatus 201), and performs close proximity wireless communication. In other words, the contactless IC 102 does not have a power supply function for converting magnetic flux received by the antenna 103 into power and supplying power for wireless communication, and requires the power supply VDD to operate an internal circuit to perform wireless communication.

Figure 10:
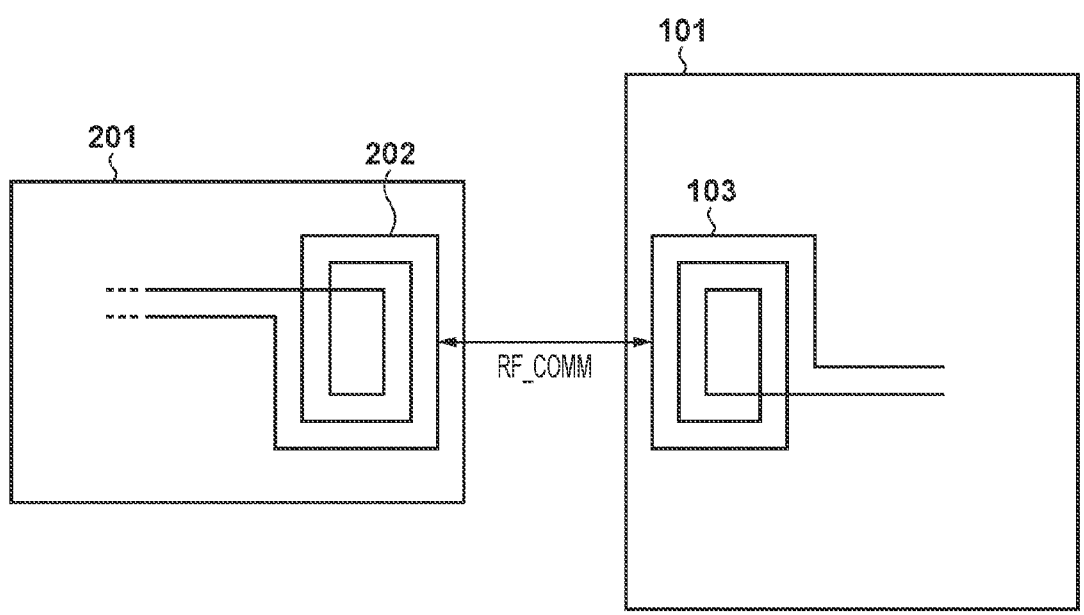
FIG. 10 is a view schematically illustrating close proximity wireless communication with a communication apparatus 201 equipped with a contactless IC reader/writer.

FIG. 10 schematically illustrates a state in which the digital camera 101 uses the antenna 103 to perform close proximity wireless communication with the communication apparatus 201. An antenna 202 is an antenna that the communication apparatus 201 uses to perform close proximity wireless communication as a contactless IC reader and writer function, and it communicates with the antenna 103 of the digital camera 101.

With reference to FIG. 1 again, description is given regarding the contactless IC 102. The contactless IC 102 includes a contactless IC tag for performing close proximity wireless communication, for example, and outputs an RE detection signal upon receiving a communication or an electromagnetic wave from an external unit. An RE detection signal terminal configures an open drain or open collector transistor output (negative logic) that enters a high impedance state when OFF, and enters a conductive state when ON. Note that, RF_COMM is used as a signal name for the contactless IC 102 receiving a communication or an electromagnetic wave from an external unit. In addition, the RF detection signal output to the contactless IC 102 is referred to as an /RF_INT signal.

A CPU (Central Processing Unit) 153 controls the digital camera 101 as a whole. A RAM (Random Access Memory) 154 is a memory that is used as a work area of the CPU 153. A ROM (Read Only Memory) 155 is configured by a non-volatile memory capable of rewriting, such as a flash memory for example, and stores, for example, constants for operation or a program for the CPU 153.

A display unit 158 is configured by an LCD (Liquid Crystal Display) for example, and displays an image such as image data or operation information. An operation unit 159 receives various operations by a user to the digital camera 101, and transmits operation information to the CPU 153. The operation unit 159 is configured by a plurality of button switches or dials, buttons on a touch panel, or the like for example.

A memory card 160 can perform reading and writing of digital data. An image capturing unit 161 is configured from an imaging optical system, an optical unit configured by a driving system therefor, and an image capturing element.

The contactless IC 102 described above requires a power supply VDD in a case of causing an IC_I/F which is a wired interface to operate. If the power supply VDD is supplied, because the contactless IC 102 and the CPU 153 can communicate via the IC_I/F the CPU 153 can perform control of close proximity wireless communication with respect to the contactless IC 102, and perform reading and writing of internal data.

A transistor 104 is a transistor (hereinafter may be referred to simply as TR) for inverting the logic of the /RF_INT signal (in other words, the RF detection signal). A resistor 105 is a base resistor of the transistor 104, and a resistor 106 is a base-emitter resistor of the transistor 104. In addition, a TR 108 is a TR for also inverting the logic of the signal output from the TR 104 and transmitting it to the CPU 153. A resistor 109 is a base resistor of the TR 108, and a resistor 110 is a base-emitter resistor of the TR 108. A resistor 111 is a pull-up resistor of IN1 of the CPU 153. If the /RF_INT signal of the contactless IC 102 becomes ON, the TR 104 and the TR 108 become ON, and the /RF_INT signal is transmitted to IN1.

A TR 112 is a TR for performing a switching operation to transmit a voltage VBATT of a battery 151 toward ADIN of the CPU 153. A resistor 113 is a base resistor of the TR 112, and a resistor 114 is a base-emitter resistor of the TR 112. A resistor 118 and a resistor 119 are voltage dividing resistors for dividing the voltage VBATT of the battery 151 and inputting a divided voltage to ADIN in a case when the TR 112 is ON.

A TR 115 is a TR for inverting logic of OUT1 of the CPU 153. A resistor 116 is a base resistor of the TR 115, and a resistor 117 is a base-emitter resistor of the TR 115. When OUT1 of the CPU 153 is put into a HIGH state (also expressed simply as H), the TR 115 and the TR 112 become ON, and a result of dividing the voltage VBATT of the battery 151 is conveyed to ADIN.

The battery 151 is a battery for providing power to each unit of the digital camera 101. The battery 151 may have a configuration such that it is capable of being attached/detached with respect to the digital camera 101. A power supply IC-A 152 converts the voltage of the battery 151 and outputs a voltage VOUT_A, in accordance with a control signal EN_A from an external unit. The control signal EN_A of the power supply IC-A 152 is connected to OUT2 of the CPU 153 via a diode 123 and a resistor 122, and is configured so that it can be controlled by the CPU 153. The power supply IC-A. 152 monitors the output voltage of VOUT_A, and has a reset IC function for outputting a hardware reset signal if the output voltage of VOUT_A exceeds a predetermined threshold. The power supply IC-A 152 further outputs an L-level signal for /RESET from /RESET_OUT to /RESET_IN of the CPU 153, and is configured so as to cause a hardware reset of the CPU 153 to occur. Note that the output of /RESET_OUT of the power supply IC-A 152 is, if the battery is connected, outputting at an H-level by default. Outputting at the L-level is performed only is a case of performing a hardware reset. In addition, there is no output if a battery is not connected.

If OUT2 of the CPU 153 is made to be H an SW_LATCH signal becomes H and the power supply 1C-A. 152 becomes ON, and the power supply IC-A 152 outputs VOUT_A. Note that description is given later regarding operation of the diode 123. In the following explanation, the SW_LATCH signal is also referred to as a software activation signal.

A wireless communication unit 165 performs wireless communication that conforms to a wireless communication standard different to the close proximity wireless communication with the contactless IC 102, for example IEEE 802.11 which is a WLAN standard, and performs transmission/reception of data with an external apparatus. An antenna 166 is an antenna for performing wireless communication by the wireless communication unit 165.

A button switch 125 is a switch for switching between power ON or OFF (ON/OFF) of the digital camera 101. The button switch 125 is a power supply button switch for turning the power supply IC-A 152 ON, and causing the CPU 153 of the digital camera 101 to operate. When the button switch 125 is pressed, the voltage VBATT supplied from the battery 151 is output as an HW_LATCH_PSW signal, and input to the control signal EN_A of the power supply IC-A 152 via a diode 124 and the resistor 122.

The diodes 123 and 124 are arranged so as to make an OR connection between the SW_LATCH signal output by the CPU 153 and the HW_LATCH_PSW signal output from the button switch 125. A signal resulting from performing an OR operation on the SW_LATCH signal and the HW_LATCH_PSW signal is referred to as an HW_LATCH signal. In the following explanation, the HW_LATCH signal is also referred to as a hardware activation signal.

The power supply IC-A 152 is configured such that, when it is input with either of the SW LATCH signal or the HW_LATCH_PSW signal, the power supply IC-A 152 becomes ON and outputs VOUT_A.

A TR 126 is a TR for inverting the logic of the HW_LATCH_PSW signal of the button switch 125 and conveying to the CPU 153. A resistor 127 is a base resistor of the TR 126, and a resistor 128 is a base-emitter resistor of the TR 126. A resistor 129 is a pull-up resistor of IN2 of the CPU 153. When the HW_LATCH_PSW signal of the button switch 125 becomes ON (in other words, when the path of the HW_LATCH_PSW signal has become electrically connected), the TR 126 becomes ON, and a PWR_SW_IN2 signal is conveyed to IN2 of the CPU 153.

A control circuit 171 is a circuit for controlling ENABLE (enabling) or DISABLE (disabling) of close proximity wireless communication by the contactless IC 102 (in other words it functions as an enabling circuit and a disabling circuit). The control circuit 171 is configured so that a power supply VDDIN_CIR for the circuit as a whole is obtained from the voltage VBATT of the battery 151, and power is always supplied if the battery 151 is present. If there is a change from a state in which the power supply VDDIN_CIR is not supplied to the control circuit 171 to supply of the power supply VDDIN_CIR having been started, logic of each circuit of the control circuit 171 which are described later is set to an initial state, and function thereof is negated. In addition, if there is a change from a state in which the power supply VDDIN_CIR is supplied to the control circuit 171 overall to supply of the power supply VDDIN_CIR having been terminated, function of each circuit of the control circuit. 171 which are described later is negated.

The HW_LATCH signal is connected to an INVERTER 175 of the control circuit 171, and the SW_LATCH signal is connected to an INVERTER 176 of the control circuit 171. Outputs of the INVERTER 175 and the INVERTER 176 are each connected to an input of an AND 179.

Furthermore, output of OUT3 of the CPU 153 (an RF_EN_OUT 3 signal) is connected to an input of an OR 177 along with the SW_LATCH signal. The RF_EN_OUT 3 signal is also referred to below as a contactless IC enable signal. The RF_EN_OUT 3 signal is output by software control executed in the CPU 153. The SW_LATCH signal is output in a state of always being H if the RF_EN_OUT 3 signal in a controllable state. Therefore, the output of the OR 177 is always H. In other words, in the circuit of FIG. I of the present embodiment, the contactless IC is always ON if the CPU 153 is in an activated state. In this way, a case of connecting the SW LATCH signal to the input of the OR 177 is a design for making the contactless IC always be ON by hardware, in a state in which the CPU 153 has been activated. In contrast, a design such that the SW_LATCH signal is not connected to the OR 177 may also be considered. In such a case, output of the OR 177 is determined by only the RF_EN_OUT 3 signal. A designer may make the contactless IC always be ON by software in accordance with a program executed by the CPU 153.

Output of the OR 177 and output of the AND 179 are connected to inputs of an. OR 180, and output of the OR 180 is connected to a DLY 181. The DLY 181 outputs a signal after causing a leading edge input to be delayed by a fixed interval (the interval: given as Tdly), but outputs a signal without causing a delay for a falling edge input. Note that the output of the DLY 181 (also referred to as an RF_EN signal) is connected to an SW 182.

The SW 182 is configured by combining a bipolar transistor, a MOSFET, or the like. The SW 182 turns ON (in other words a conductive state) when output of the DLY 181 is H, and the SW 182 turns OFF (in other words, a high impedance state) when output of the DLY 181 is a LOW state (also simply expressed as L). When the SW 182 is ON, the voltage VOUT_A of the power supply IC-A 152 is supplied to VDD of the Contactless IC 102 and close proximity wireless communication by the contactless IC 102 becomes ENABLE. However, when the SW 182 is OFF, because the voltage VOUT_A of the power supply IC-A 152 is not supplied to VDD of the contactless IC 102, close proximity wireless communication by the contactless IC 102 becomes DISABLE. Note that the voltage VOUT_A of the power supply IC-A 152 that is output via the SW 182 is also referred to as VDD_RF_EN.

(Control of Contactless IC 102 by Control Circuit 171)

FIG. 2 is a truth table related to states of the control circuit. 171 which controls the contactless IC 102 according to the present embodiment, and operation of close proximity wireless communication by the contactless IC 102. In the truth table of FIG. 2, a combination that cannot be obtained by combining signals is given as INHIBIT, and operation of close proximity wireless communication by the contactless IC 102 is illustrated by "—".

When the HW_LATCH signal (a hardware activation signal) is L, and the SW_LATCH signal (a software activation signal) or the RF_EN_OUT 3 signal (the contactless IC enable signal) is L, the RF_EN signal is H. However, because this is a state in which the voltage VOUT_A of the power supply IC-A 152 is not output (in other words L), close proximity wireless communication by the contactless IC 102 becomes DISABLE.

In addition, when the HW_LATCH signal is H, and the SW_LATCH signal or the RF_EN_OUT 3 signal is L, the RF_EN signal is L and close proximity wireless communication by the contactless IC 102 is DISABLE. In other words, it is possible to paraphrase in that, when the voltage VOUT_A of the power supply IC-A 152 is output, a state in which the logic of the HW_LATCH signal and the SW_LATCH signal or the RE_EN_OUT 3 signal do not match means that close proximity wireless communication by the contactless IC 102 is DISABLE.

When the HW_LATCH signal is H, and the SW LATCH signal or the R_EN_OUT 3 signal is H, the R_EN signal is H and close proximity wireless communication by the contactless IC 102 becomes ENABLE. In other words, it is possible to paraphrase in that, when the voltage VOUT_A of the power supply IC-A 152 is output, a state in which the logic of the HW_LATCH signal and the SW_LATCH signal or the RF_EN_OUT 3 signal match means that close proximity wireless communication by the contactless IC 102 is ENABLE.

(Series of Operations For Control Processing of Contactless IC 102 by Control Circuit 171)

Figure 3:
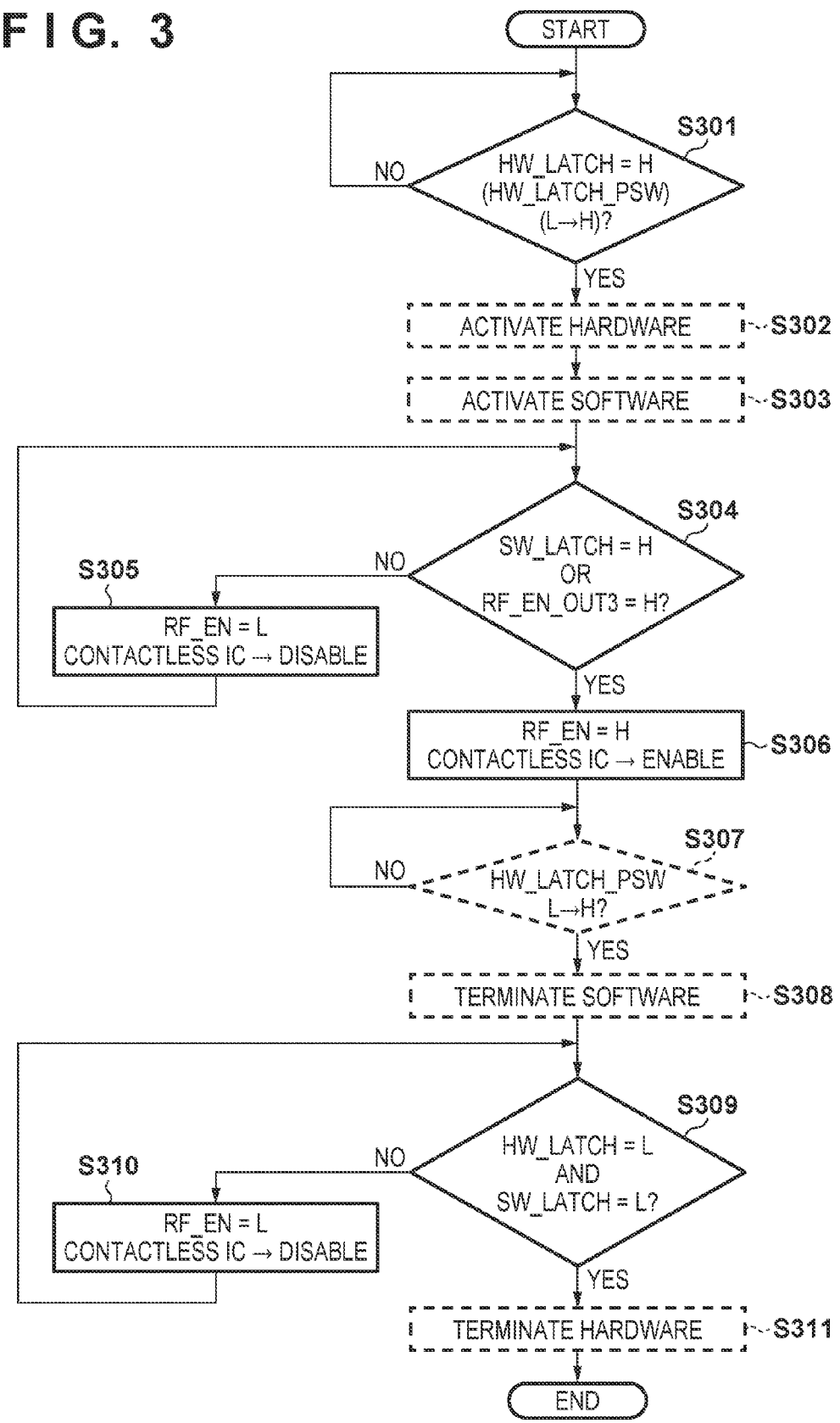
FIG. 3 is a flowchart illustrating a series of operations of control processing of the contactless IC 102 according to the first embodiment.

Next, with reference to FIG. 3, description is given regarding a series of operations for control processing of the contactless IC 102. Note that, for each step of the flowchart illustrated in FIG. 3, while there is no particular limitation, it is executed by the control circuit 171. However, steps illustrated by broken lines is processing in the CPU 153.

In step S301, the power supply IC-A 152 determines whether the HW_LATCH signal is H. Note that, in step S301 a transition of the HW_LATCH signal is equivalent to a transition of the HW_LATCH_PSW signal of the button switch 125. The button switch 125 is assumed to be operated by a user of the digital camera 101, and after the button switch 125 is pressed, it is assumed that a pressed state of the button switch 125 is cancelled. When the HW_LATCH signal is L, the power supply IC-A 152 returns processing to step S301 assuming that the button switch 125 is not pressed, and when the HW_LATCH signal is H, it is assumed that the button switch 125 has been pressed and the processing advances to step S302.

In step S302, the hardware of the CPU 153 is activated. For hardware activation, the power supply IC-A 152 turns from OFF to ON in accordance with the HW_LATCH signal becoming H, VOUT_A is output, and the power supply IC-A 152 having detected the rise of the voltage of VOUT_A outputs the /RESET signal by the L-level to perform a hardware reset of the CPU 153, and after a predetermined interval (an interval sufficient for the state to be reset) has elapsed, sets the /RESET signal to H, and cancels the hardware reset of the CPU 153.

In step S303, the CPU 153 activates software that is executed in the CPU 153. Specifically, the software activation corresponds to an operation in which the CPU 153, after a hardware reset, loads and activates a processing procedure (in other words, a program) stored in the ROM 155, and the SW_LATCH signal becomes H. Note that, in step 303, the CPU 153 may perform control to set the RF_EN_OUT 3 signal to H if software is successfully activated or if software is successfully activated and operation of the contactless IC 102 is enabled.

In step S304, the control circuit 171 determines whether the SW_LATCH signal or the RF_EN_OUT 3 signal is H or L. If the SW_LATCH signal or the RF_EN_OUT 3 signal is L, the control circuit 171 advances processing to step S305, and in step S305, the control circuit 171 sets the RF_EN signal to L, outputs it, and sets the contactless IC 102 to DISABLE. The control circuit 171 subsequently returns the processing to step S304. Meanwhile, if the SW_LATCH signal or the RF_EN_OUT 3 signal is H in step S304, the control circuit 171 sets the RF_EN signal to H in step S306, outputs it, and sets the contactless IC 102 to ENABLE.

In step S307, the CPU 153 determines whether the HW_LATCH PSW signal has transitioned from L to H, via the activated program. The button switch 125 which outputs the HW_LATCH PSW signal is operated by a user of the digital camera 101. If the CPU 153 determines that the HW_LATCH_PSW signal has not transitioned from L to H, it returns to the processing of step S307 again, and waits for a change of the HW_LATCH_PSW signal. In parallel with this, the CPU 153 controls operation of the digital camera 101 in accordance with the activated program. Meanwhile, if the CPU 153 determines that the HW_LATCH_PSW signal has transitioned from L to H, it advances the processing to step S308, and terminates the software step S308. A software termination corresponds to an operation in which the CPU 153 sets the SW_LATCH signal to L after operation termination processing for the software.

In step S309, the control circuit 171 determines whether the HW_LATCH signal and the SW_LATCH signal are both L. If it is determined to be not the case that the HW_LATCH signal and the SW_LATCH signal are both L, in step S310, the RF_EN signal is set to L and output, and the contactless IC 102 is set to DISABLE. Thereafter the control circuit 171 returns the processing to step S309, and determines the state of the signal. In step S309, a case in which the HW_LATCH signal and the SW_LATCH signal are both not L is, for example, a case in which a pressed state of the button switch 125 that is operated in step S307 is not cancelled, the pressed state continues unchanged, and the HW_LATCH signal continues as H unchanged without becoming L. If it is determined that the HW_LATCH signal and the SW_LATCH signal are both L, the control circuit 171 advances the processing to step S311, and in step S311 the CPU 153 terminates the hardware, and thereafter this series of operations terminates. A hardware termination is performed by, in accordance with the HW_LATCH signal changing to L, changing the power supply IC-A 152 from ON and OFF which reduces VOUT_A of the power supply IC-A 152, and transitioning the /RESET signal from H to L.

(Signal Control Procedure for Controlling Contactless IC 102)

Next, with reference to FIGS. 4A-4C, description is given regarding an example of a signal control procedure for controlling the contactless IC 102, FIG. 4A through FIG. 4C each illustrate an exemplary operation that is described below.

Note that a description of an operating period of each signal in the timing charts of FIG. 4A through FIG. 4C is as below.

Trst: an interval until the /RESET signal of the power supply IC-A 152 is output.

Tswbt: a software activation interval from when the HW_LATCH signal becomes H, passing the hardware reset of the interval of Trst, and until the SW_LATCH signal is output.

Tdly: a leading edge delay interval of the DLY 181.

Tpsw1: an interval 1 in which the button switch 125 is pressed.

Tpsw2: an interval 2 in which the button switch 125 is pressed. (Tpsw2≥Tpsw1)

Tint1: an /RFINT signal output interval 1 with respect to RF_COM.

Tsd: a software termination interval.

Tpd: an interval from when the HW_LATCH signal becomes L until the output VOUT_A voltage of the power supply IC-A. 152 drops and a hardware reset is performed.

Note that it is assumed that Tdly and Tpd are in a relationship of Tdly≥Tpd.

Firstly, with reference to FIG. 4A, description is given for each phase of the control procedure. FIG. 4A illustrates an exemplary control procedure for a case in which the digital camera 101 is activated by a press of the button switch 125, and wireless communication is performed by the contactless IC 102.

In PHASE1, firstly, in accordance with the HW_LATCH_PSW signal transitioning from L to H due to the press of the button switch 125, the HW_LATCH signal transitions from L to H, and hardware activation begins.

In a period in which the HW_LATCH signal is H and the SW_LATCH signal is L, close proximity wireless communication by the contactless IC 102 is DISABLE because the RF_EN signal is L. In such a case, output of the output VOUT_A of the power supply IC-A 152 begins, and the /RESET signal transitions from L to H by a predetermined voltage. Here, a period from output of VOUT_A starting and until the /RESET signal transitions from L to H is a hardware reset interval of the CPU 153. The software activation begins after the CPU 153 has performed a hardware reset, and furthermore the SW_LATCH signal transitions from L to H at a point in time when the software activation completes. Furthermore, after Tdly from when the SW_LATCH signal transitions from L to H, RF_EN transitions from L to H. Thereafter, pressing of the button switch 125 by a user terminates, and the HW_LATCH_PSW signal transitions from H to L.

By such processing, subsequently in a period in which the HW_LATCH signal is H and the SW_LATCH signal is H, close proximity wireless communication by the contactless IC 102 is ENABLE because the RF_EN signal is H.

In PHASE2 when the contactless IC 102 receives as electromagnetic wave or a communication from an external unit, the /RF_INT signal transitions from H to L, and the CPU 153, which has detected this transition, communicates with the contactless IC 102 via the IC_I/F and cancels the /RE_INT signal.

Next, with reference to FIG. 4B, description is gives for each phase. FIG. 4B illustrates a first case in which, after the digital camera 101 is activated by a press of the button switch 125, the digital camera 101 is terminated in accordance with a further press of the button switch 125. Note that, because operation of PHASE1 is the same as in FIG. 4A, explanation thereof is omitted.

In PHASE3, a user presses the button switch 125 again to turn the power supply of the digital camera 101 off. By the press of the button switch 125 the HW_LATCH_PSW signal transitions from L to H, and the CPU 153, having detected this transition, terminates the software, and the SW_LATCH signal transitions from H to L. Note that this is a state in which the button switch 125 is still pressed and has not been released.

In a period in which the software has terminated and the button switch. 125 has not yet been released, the HW_LATCH signal is H and the SW_LATCH signal is L. In this period, close proximity wireless communication by the contactless IC 102 is DISABLE because the RE_EN signal is L. Consequently, in the present embodiment, close proximity wireless communication is already DISABLE even at a timing at which the hardware reset has not yet been performed. By this, even if close proximity wireless communication is performed at this timing when the software is terminated and the hardware has not been terminated, a problem in which only the hardware enters an activated state does not occur.

Next, if the button switch 125 is released and the HW_LATCH_PSW signal transitions from H to L, the HW_LATCH signal transitions from H to L and a hardware termination begins. Output of the output VOUT_A of the power supply IC-A 152 stops and drops, the /RESET signal transitions from H to L by a predetermined voltage, and a hardware reset of the CPU 153 is performed.

After Idly from when the HW_LATCH signal transitions from H to L, RF_EN transitions from L to H. Here, if output of the output VOUT_A of the power supply IC-A 152 stops and drops, an interval in which the /RESET signal transitions from H to L by a predetermined voltage is Tpd, but idly and Tpd are in a relationship of Tdly≥Tpd as described above. In this way, when output of the output VOUT_A of the power supply IC-A 152 stops and drops, and the /RESET signal transitions from H to L by a predetermined voltage, it is possible to cause RF_EN to transition from L to H after performing a hardware reset of the CPU 153.

Subsequently, in a period in which the HW_LATCH signal and the SW_LATCH signal is L, although the RF_EN signal H, the output VOUT_A of the power supply IC-A 152 is in a state of not being output and so wireless communication by the contactless IC 102 is DISABLE.

Next, with reference to FIG. 4C, description is given for each phase. FIG. 4C illustrates a second case in which, after the digital camera 101 is activated by a press of the button switch 125, the digital camera 101 is terminated in accordance with a further press of the button switch 125. An example illustrated in FIG. 4C differs from the example of FIG. 4B only in a period in which the HW_LATCH_PSW signal transitions from H to L after transitioning from L to H at a time when software is terminated, in other words an interval in which the button switch 125 is being pressed. Note that, because operation of PHASE1 is the same as in FIG. 4A, explanation thereof is omitted.

In PHASE4, because timings other than a period from when the HW_LATCH_PSW signal transitions from H to L after it transitions from L to H are the same as in FIG. 4B, explanation thereof is omitted.

A characteristic operation illustrated in FIG. 4C is that a period in which the R_EN signal is set to L and wireless communication by the contactless IC 102 is DISABLE lengthens in accordance with a period, in which the button switch 125 is being pressed during a software termination time, lengthening. If the button switch 125 continuously pressed for a long duration, because a release timing becomes accordingly delayed, if the present invention is not applied, there is a higher possibility that problems arise because a state in which a hardware reset is not performed despite software being reset continues. In contrast, if the present invention is applied, it is possible to reliably prevent problems because the contactless IC is disabled even in such a case.

As given above, in accordance with the present embodiment, in a state in which the output. VOUT_A of the power supply IC-A 152 is output, if the hardware activation signal and the software activation signal match, wireless communication by the contactless IC is ENABLE. In contrast, if the hardware activation signal and the software activation signal do not match, close proximity wireless communication by the contactless IC is DISABLE.

As described above, in the present embodiment, configuration is taken to enable (ENABLE) close proximity wireless communication by the contactless IC in accordance with the hardware activation signal and the software activation signal matching. In contrast, configuration is taken to disable (DISABLE) close proximity wireless communication by the contactless IC in accordance with the hardware activation signal and the software activation signal ceasing to match. In this way, in a wireless communication apparatus in which hardware is in an operation state where a power supply is input transiently and software is is a non-operation state, it is possible to perform appropriate control so that an operation state of close proximity wireless communication by a contactless IC does not enter a state in which operation is possible. In other words, it becomes possible to prevent contention of software and hardware operation states of the digital camera 101 when performing contactless wireless communication.

(Second Embodiment)

Next, explanation is given for a second embodiment. In the first embodiment, description was given regarding an example of controlling the contactless IC 102 is a configuration in which a power supply for causing the contactless IC 102 to operate is supplied to it by wire. The second embodiment differs in a point of a configuration in which close proximity wireless communication is performed with an electromagnetic wave from an external apparatus as power and the digital camera 101 activated. Note that further configuration according to a second embodiment is the same as in the first embodiment. For these reasons, the same reference numerals are given to the same elements, and overlapping explanation is omitted, and predominantly explanation is given for differences.

(Configuration of Digital Camera 501)

Figure 5:
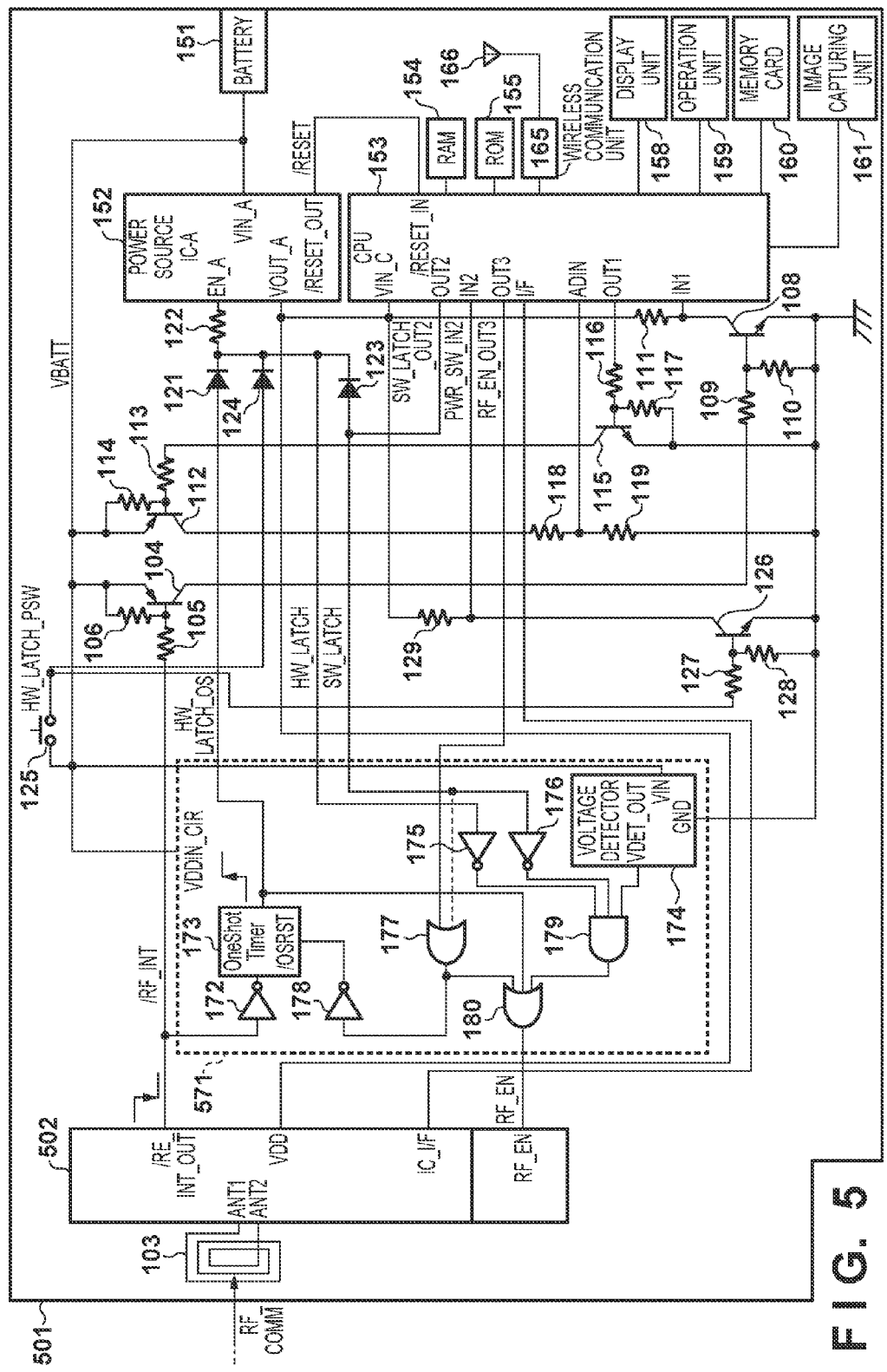
FIG. 5 is a block diagram illustrating an example of a functional configuration of a digital camera 501 according to a second embodiment.

FIG. 5 is a block diagram illustrating (in particular, illustrating in detail a configuration for controlling a contactless IC 502) an example of a functional configuration of the digital camera 501 according to the present embodiment.

The contactless IC 502 has a power supply function for generating power from an electromagnetic wave received by the antenna 103 and supplying power for the close proximity wireless communication. Accordingly, the contactless IC 502 can perform close proximity wireless communication by using an electromagnetic wave from an external apparatus, irrespective of the existence or absence of a supply of the power supply VDD. Furthermore, the contactless IC 502 can use the RF_EN signal from a control circuit 571 to control ENABLE/DISABLE of operation of short distance wireless communication in the contactless IC 502. Specifically, if the RF_EN signal of the contactless IC 502 is L, operation of close proximity wireless communication by the contactless IC 502 becomes DISABLE, and if the RF_EN signal is H, operation of close proximity wireless communication by the contactless IC 502 becomes ENABLE. Note that a circuit for controlling operation of close proximity wireless communication and the RF_EN signal of the contactless IC 502 may be provided inside the contactless IC 502, or it may be an external circuit.

A diode 121 is arranged for making an OR connection between an HW_LATCH_OS signal from the control circuit 571 which is described later, and the SW_LATCH signal and the HW_LATCH_PSW signal which are described above. The control circuit 571 is a circuit for controlling ENABLE/DISABLE of operation of close proximity wireless communication by the contactless IC 502. The control circuit 571 is configured so that a power supply VDDIN_CIR for the circuit as a whole is obtained from the voltage VBATT of the battery 151, and power is always supplied if the battery 151 is present. If there is a change from a state in which the power supply VDDIN_CIR is not supplied to the control circuit 571 overall to supply of the power supply VDDIN_CIR having been started, logic of each circuit of the control circuit 571 which is described later is set to an initial state, and function thereof is negated. In addition, if there is a change from a state in which the power supply VDDIN_CIR is supplied to the control circuit 571 overall to this supply having been terminated, function of each circuit of the control circuit 571 which is described later is negated.

The /RF_INT signal of the contactless IC 502 is connected to an INVERTER 172 of the control circuit 571. Output of the INVERTER 172 is connected to input of a OneShotTimer 173. The OneShotTimer 173 outputs a H signal for a fixed interval (let OneShotTimer interval be Tos) triggered by a rising edge of input, and for a duration of Tos, configuration is such that signal is not output even if a rising edge is input again. In addition, the OneShotTimer 173 stops a signal output in accordance with input of an /OSRST signal.

Output of the OneShotTimer 173 (the HW_LATCH_OS signal) is connected to input of the diode 121 and the OR. 180. The HW_LATCH_OS signal is also referred to as a hardware activation one-shot signal. If the HW_LATCH_OS signal is H, the RF_EN signal becomes H, close proximity wireless communication by the contactless IC 502 becomes ENABLE irrespective of logic of other signals input to the OR 180.

Output of the OR 177 is connected to an INVERTER 178, and output of the INVERTER 178 is connected to /OSRST of the OneShotTimer 173. If the R_EN_OUT 3 signal or the SW_LATCH signal is H, /OSRST of the OneShotTimer 173 becomes L, and output of the OneShotTimer 173 stops.

A voltage detection circuit 174 detects the voltage VBATT of the battery 151, and if it is less than a voltage threshold value Vth, sets a VDET_OUT signal to L and outputs, and if it is greater than or equal to the voltage threshold value Vth, sets the VDET_OUT signal to H and outputs. Because a power supply of the voltage detection circuit 174 is the battery 151, the voltage detection circuit 174 functions irrespective of operation of the digital camera 501 if the battery 151 is present. Note that the voltage threshold value Vth of the voltage detection circuit 174 is a voltage value that is higher than a lowest operational voltage of the power supply IC-A 152, and is set to a voltage value for which normal operation of each software function by the CPU 153 is guaranteed. The VDET_OUT signal output by the voltage detection circuit 174 is connected to an input of the AND 179 together with outputs of the INVERTER 175 and the INVERTER 176.

(Control of Contactless IC 502 by Control Circuit 571)

FIG. 6 is a truth table related to states of the control circuit 571 which controls the contactless IC 502 according to the present embodiment, and operation of close proximity wireless communication by the contactless IC 502. In the truth table of FIG. 6, a combination that cannot be obtained by combining signals is given as INHIBIT, and operation of close proximity wireless communication by the contactless IC 502 is illustrated by "—".

Firstly, description is given regarding a case in which the VDET_OUT signal of the voltage detection circuit 174 is L (for example, if the battery 151 is not present). If signals other than the VDET_OUT signal are L, wireless communication operation by the contactless IC 502 is DISABLE. In addition, when the HW_LATCH signal is H, and the SW_LATCH signal or the R_EN_OUT 3 signal is L, the R_EN signal is L and close proximity wireless communication by the contactless IC 502 is DISABLE. In other words, it is possible to paraphrase as, in a state where logic between the HW_LATCH signal and the SW_LATCH signal or the R_EN_OUT 3 signal does not match, close proximity wireless communication by the contactless IC 502 is DISABLE.

When the HW_LATCH signal is H, and the SW_LATCH signal or the RF_EN_OUT 3 signal is H, the RF_EN signal is H and close proximity wireless communication by the contactless IC 502 becomes ENABLE. In other words, even if the VDET_OUT signal is L, a state in which the logic of the HW_LATCH signal, and the SW_LATCH signal or the RF_EN_OUT 3 signal match as H can be paraphrased as one in which close proximity wireless communication by the contactless IC 502 is ENABLE.

If the HW_LATCH_OS signal is H, the HW_LATCH signal is H and the SW_LATCH signal or the RE_EN_OUT 3 signal is L, the RF_EN signal is H and close proximity wireless communication by the contactless IC 502 is ENABLE. In other words, it is possible to paraphrase in that, in a period when the HW_LATCH_OS signal is H, even in a state in which the logic of the HW_LATCH signal, and the SW_LATCH signal or the RE_EN_OUT 3 signal do not match, close proximity wireless communication by the contactless IC 502 is ENABLE.

Next, description is given regarding a case in which the VDET_OUT signal of the voltage detection circuit 174 is H. If signals other than the VDET_OUT signal are L, close proximity wireless communication by the contactless IC 502 is ENABLE. It is possible to paraphrase in that, because normal operation of each software function by the CPU 153 is guaranteed by the voltage threshold value Vth of the voltage detection circuit 174, close proximity wireless communication by the contactless IC 502 is ENABLE.

Note that, because combinations other than those described above are the same as those in the case when the VDET_OUT signal of the voltage detection circuit 174 is L, explanation thereof is omitted.

(Series of Operations for Control Processing of Contactless IC 502 by Control Circuit 571)

Next, with reference to FIG. 7, description is given regarding a series of operations for control processing of the contactless IC 502. Description is given in that, while there is no particular limitation, each step of the flowchart illustrated in FIG. 7 is executed by the control circuit 571, although steps illustrated by broken lines are executed by the CPU 153.

In step S701, the control circuit 571 determines whether the voltage VBATT of the battery 151 is a threshold value or more. If the voltage VBATT of the battery 151 is less than the threshold value and the VDET_OUT signal is L, the control circuit 571 advances processing to step S702. In step S702, the control circuit 571 outputs the RF_EN signal by L, and sets the contactless IC 502 to DISABLE. The control circuit 571 subsequently advances the processing to step S301.

Meanwhile, in step S701 again, if the voltage VBATT of the battery 151 is greater than or equal to the threshold value and the VDET_OUT signal is H, the control circuit 571 advances processing to step S703.

In step S703, the control circuit 571 determines whether the HW_LATCH signal and the SW_LATCH signal are both L. If it is not the case that the HW_LATCH signal and the SW_LATCH signal are both L, the control circuit 571 advances the processing to step S702. Meanwhile, it the HW_LATCH signal and the SW_LATCH signal are both L, the control circuit 571 advances the processing to step S704, and, in step S704, outputs the RF_EN signal by H and sets the contactless IC 502 to ENABLE.

In step S705, the control circuit 571 determines whether the /RF_INT signal of the contactless IC 502 is L, in other words whether the contactless IC 102 has received a communication or an electromagnetic wave from an external unit. If the /RF_INT signal of the contactless IC 502 is H (an electromagnetic wave or a communication is not received), the control circuit 571 advances processing to step S301. In step S301 to step S306, the control circuit 571 and the CPU 153 respectively execute processing that is similar to that in the first embodiment, in the case when the contactless IC 502 has not received a communication or an electromagnetic wave. Meanwhile, if the /RF_INT signal of the contactless IC 502 is L (an electromagnetic wave or a communication is not received), the control circuit 571 advances processing to step S706.

In step S706, in accordance with the contactless IC 502 having received a communication or an electromagnetic wave, the control circuit 571 outputs the HW_LATCH_OS signal as H, and then in step S707 the CPU 153 activates the hardware. Furthermore, in step S708, the control circuit 571 outputs the RF_EN signal as H, and sets the contactless IC 502 to ENABLE. Thereafter, in step S709 the CPU 153 activates the software, and advances the processing to step S710.

In step S710, the control circuit 571 determines whether the SW_LATCH signal or the RF_EN_OUT 3 signal is H. If the SW_LATCH signal or the RF_EN_OUT 3 signal is L, the processing advances to step S711. In contrast, if the control circuit 571 determines that the SW_LATCH signal or the RF_EN_OUT 3 signal is H, the processing advances to step S713.

In step S711, the control circuit 571 determines whether a fixed interval has elapsed after outputting the HW_LATCH_OS signal as H. If it is determined that the fixed interval has not elapsed the processing returns to step S710, and if it is determined that the fixed interval has elapsed the processing proceeds to step S712. In step S712, the control circuit 571 outputs the HW_LATCH_OS signal as L, and the processing advances to step S308.

In step S713, the control circuit 571 outputs the RF_EN signal as H, and sets the contactless IC 502 to ENABLE. Thereafter, in step S714, the HW_LATCH_OS signal is set to L and output, and the processing advances to step S307.

Because operation for step S307 to step S311 is similar to the flowchart of FIG. 3 according to the first embodiment, description thereof is omitted. Finally, in step S311 the hardware terminates, and this flowchart terminates.

(Signal Control Procedure for Controlling Contactless IC 102)

Next, with reference to FIGS. 8A-8D, description is given regarding an example of a signal control procedure for controlling the contactless IC 502. FIG. 8A through FIG. 8D each illustrate an exemplary operation that is described below. Note that a description of operating periods of each signal in the timing charts of FIG. 8A through FIG. 8D is as below. Description of operation intervals that are the same as that in the timing charts illustrated in FIGS. 4A-4C of the first embodiment is omitted.

Tos: OneShotTimer interval of an HW_LATCH_OS signal output of the OneShotTimer 173.

Tint2: an second. /RF_INT signal output interval with respect to RF_COMM.

Note that a relationship between Tos and. Tswbt is Tos≥Tswbt; and a relationship between Tos, Tpd and Tswbt is that Tos>(Tpd+Tswbt).

Firstly, with reference to FIG. 8A, description is given for each phase of the control procedure. FIG. 8A illustrates an exemplary control procedure for a case in which the digital camera 501 is activated by a press of the button switch 125, and close proximity wireless communication is performed by the contactless IC 502.

In PHASE6, when there is a transition from a state in which the battery 151 is not present to a state in which it is inserted, the voltage detection circuit 174 outputs the VDET_OUT signal as H if a voltage applied by the battery 151 is greater than or equal to the voltage threshold value Vth. Because in this period, the HW_LATCH signal is L and the SW_LATCH signal is L and also the RF_EN signal is H, close proximity wireless communication by the contactless IC 502 is ENABLE.

In PHASE7, a user presses the button switch 125 to turn the power supply of the camera on. By this, the HW_LATCH_PSW signal transitions from L to H, the HW_LATCH signal transitions from L to H and a hardware activation begins. In a period in which the HW_LATCH signal is H and the SW_LATCH signal is L, close proximity wireless communication by the contactless IC 502 is DISABLE because the RF_EN signal is L.

In such a case, output of the output VOUT_A of the power supply IC-A 152 begins, and the /RESET signal transitions from L to H by a predetermined voltage. Here, a period from output of VOUT_A starting and until the /RESET signal transitioning from L to H is a hardware reset interval of the CPU 153. The software activation begins after the CPU 153 has performed a hardware reset, and furthermore the SW_LATCH signal transitions from L to H at a point in time when the software activation completes.

By such processing, subsequently in a period in which the HW_LATCH signal is H and the SW_LATCH signal is H, close proximity wireless communication by the contactless IC 502 is ENABLE because the RF_EN signal is H. Thereafter, the HW_LATCH_PSW signal transitions from H to L.

In PHASE8, when the contactless IC 502 receives a communication or an electromagnetic wave from an external unit, the /RF_INT signal transitions from H to L. Having detected the change, the CPU 153 communicates with the contactless IC 502 via the IC_I/F, and cancels the /RF_INT signal.

Next, with reference to FIG. 8B, description is given for each phase. FIG. 8B illustrates a first case of activating the digital camera 501 by close proximity wireless communication by the contactless IC 502, and terminating the digital camera 501 in accordance with a press of the button switch 125. Note that, because operation of PHASE6 is the same as in FIG. 8A, explanation thereof is omitted.

In PHASE9, when the contactless IC 502 receives an electromagnetic wave or a communication from an external unit, the HW_LATCH_OS signal transitions from L to H in accordance with the /RF_INT signal transitioning from H to L. The HW_LATCH signal transitions from L to H, and hardware activation begins. In a period in which the HW_LATCH_OS signal is H, close proximity wireless communication by the contactless IC 502 is ENABLE because the RE_EN signal is H.

In such a case, output of the output VOUT_A of the power supply IC-A 152 begins, and the /RESET signal transitions from L to H by a predetermined voltage. Here, an interval from output of VOUT_A starting and until the /RESET signal transition from L to H is a hardware reset interval of the CPU 153. The software activation begins after the CPU 153 has performed a hardware reset, and furthermore the SW_LATCH signal transitions from L to H and the HW_LATCH_OS signal transitions from H to L when the software activation completes.

Subsequently, in a period in which the HW_LATCH signal is H and the SW_LATCH signal is H, close proximity wireless communication by the contactless IC 502 is ENABLE because the RF_EN signal is H. Here, a OneShot-Timer interval of the HW_LATCH_OS signal is Tos. Therefore, when the hardware activation and the software activation are performed normally, because the SW_LATCH signal becomes H before Tos elapses, it results in an operation in which the output of the OneShotTimer 173 is stopped. Note that, to guarantee reliable execution of hardware activation and software activation by the HW_LATCH_OS signal, it is desirable for a relationship between Tos and Tswbt be Tos≥Twbt.

Note that, if hardware activation and software activation are not performed successfully due to some kind of problem, in the OneShotTimer interval Tos, output of the OneShotTimer 173 is stopped and the output VOUT_A of the power supply IC-A 152 is also stopped. Therefore, because it is not the case that output of the output VOUT_A of the power supply IC-A 152 continues without software control, safe power supply control is possible.

Thereafter, the software activation is performed, and the CPU 153, which detects the activation, communications with the contactless IC 502 via the IC_I/F and cancels /RF_INT.

In PHASE10, by the press of the button switch 125 the HW_LATCH_PSW signal transitions from L to H, and the CPU 153, having detected this transition, terminates the software, and the SW_LATCH signal transitions from H to L.

Here, in a period is which the HW_LATCH signal is H and the SW_LATCH signal is L, close proximity wireless communication by the contactless IC 502 is DISABLE because the RF_EN signal is L. Further, if pressing of the button switch 125 is released and the HW_LATCH_PSW signal transitions from H to L, the HW_LATCH signal transitions from H to L and a hardware termination begins.

Output of the output VOUT_A of the power supply IC-A 152 stops and drops, the /RESET signal transitions from H to L by a predetermined voltage, and a hardware reset of the CPU 153 is performed. Subsequently, when the HW_LATCH signal transitions from H to L, RF_EN transitions from L to H.

Subsequently, in a period in which the HW_LATCH signal H and the SW_LATCH signal is H, close proximity wireless communication by the contactless IC 502 is ENABLE because the RF_EN signal is H.

Next, with reference to FIG. 8C, description is given for each phase. FIG. 8C illustrates a second case of activating the digital camera 501 by close proximity wireless communication by the contactless IC 502, and terminating the digital camera 501 in accordance with a press of the button switch 125. Note that, because operation of PHASE6 and PHASE 9 is the same as in FIG. 8B, explanation thereof is omitted.

In PHASE 11 of the timing chart of FIG. 8C, only a period in which the HW_LATCH_PSW signal transitions from L to H and H to L at a time of a software termination, in other words an interval in which the button switch 125 is being pressed, differs from FIG. 8B. Because other timings are the same as in FIG. 8B, description thereof is omitted.

A characteristic operation illustrated in FIG. 8C is that (a period in which the RF_EN signal is L lengthens and) a period in which close proximity wireless communication by the contactless IC 502 is DISABLE lengthens in accordance with a period in which the button switch 125 is being pressed during a software termination time lengthening.

Furthermore, with reference to FIG. 8D, description is given for each phase. FIG. 8D illustrates an example in which, after the digital camera 501 is activated by close proximity wireless communication, the digital camera 501 terminates due to a press of the button switch 125, and after the termination has completed the digital camera 501 activates again due to close proximity wireless communication by the contactless IC 502. Note that, because operation of PHASE5 and PHASE5 is the same as in FIG. 8B, explanation thereof is omitted.

In PHASE12, the HW_LATCH_PSW signal transitions from L to H, and the CPU 153, having detected this transition, terminates the software, and the SW_LATCH signal transitions from H to L. In a period in which the HW_LATCH signal is H and the SW_LATCH signal is L, close proximity wireless communication by the contactless IC 502 is DISABLE because the RF_EN signal is L.

Next, if the HW_LATCH_PSW signal transitions from. H to L by pressing of the button switch 125 being cancelled, the HW_LATCH signal transitions from H to L and a hardware termination begins. Output of the output VOUT_A of the power supply IC-A 152 stops and drops, the /RESET signal transitions from H to L by a predetermined voltage, and a hardware reset of the CPU 153 is performed.

Subsequently, when the HW_LATCH signal transitions from H to L, RF_EN transitions from L to H. When the contactless IC 502 receives a communication or an electromagnetic wave from an external unit immediately after RF_EN transitioning from L to H, the /RF_INT signal transitions from H to L. The HW_LATCH_OS signal transitions from L to H, the HW_LATCH signal transitions from L to H, and the hardware activation begins. In a period in which the HW_LATCH_OS signal is H, close proximity wireless communication by the contactless IC 502 is ENABLE because the RF_EN signal is H.

The power supply IC-A 152 starts a reactivation even though the /RESET signal is L and voltage of the output VOUT_A is dropping during a hardware reset of the CPU 153. Subsequently, output of the output VOUT_A of the power supply IC-A 152 begins, and the /RESET signal transitions from L to H by a predetermined voltage. Note that an interval from output of VOUT_A starting and until the /RESET signal transitions from L to H is a hardware reset interval of the CPU 153.

After the hardware reset terminates, the CPU 153 starts software activation, and when the software activation completes the SW_LATCH signal transitions from L to H and the HW_LATCH_OS signal transitions from L to H.

Subsequently, in a period in which the HW_LATCH signal is H and the SW_LATCH signal is H, close proximity wireless communication by the contactless IC 502 is ENABLE because the RE_EN signal is H. The software activation is performed, and the CPU 153, which detects the activation, communications with the contactless IC 502 via the IC_I/F and cancels /RF_INT. Here a OneShotTimer interval of the HW_LATCH_OS signal is Tos, but if the hardware activation and the software activation are performed successfully, the SW_LATCH signal becomes H before Tos elapses. Therefore, output of the OneShotTimer 173 becomes an operation for stopping.

Rote that because as interval required for software activation is guaranteed even if a reactivation is performed while the voltage of output VOUT_A of the power supply IC-A 152 is dropping as described above, it is desirable for a relationship between Tos, Tpd and Tswbt to be Tos>(Tpd+Tswbt).

In the present embodiment as described above, in a configuration in which the digital camera 501 activates due to magnetic flux of close proximity wireless communication, configuration is such that close proximity wireless communication by the contactless IC is enabled (ENABLE) in accordance with the hardware activation signal and the software activation signal matching. In contrast, configuration is taken to disable (DISABLE) close proximity wireless communication by the contactless IC in accordance with the hardware activation signal and the software activation signal ceasing to match. However, if the digital camera 501 activates due to magnetic flux of a close proximity wireless communication, configuration is such that, even if the OneShotTimer 173 is used and the hardware activation signal and the software activation signal become unmatched, handling is the same as if these activation signals match.

In this way, when the communication apparatus activates due to close proximity that occurs while close proximity wireless communication is enabled, it is possible to prevent disabling the close proximity wireless communication that has started. In addition, it becomes possible to prevent contention of software and hardware operation states of the digital camera 501 when performing contactless wireless communication.

(Third Embodiment)

Next, explanation is given for a third embodiment. In the first embodiment and the second embodiment, description was given regarding examples in which control of operation of close proximity wireless communication by the contactless IC of the wireless communication apparatus is realized by hardware the third embodiment, description is given regarding an example in which some control of the contactless IC is realized by a SUB-CPU 971 that differs to the CPU 153 executing a program. Configuration of the digital camera of the present embodiment is a configuration that has the SUB-CPU 971, but other configuration is the same as in the second embodiment. For these reasons, the same reference numerals are given to the same elements, and overlapping explanation is omitted, and predominantly explanation is given for differences.

(Configuration of Digital Camera 901)

Figure 9:
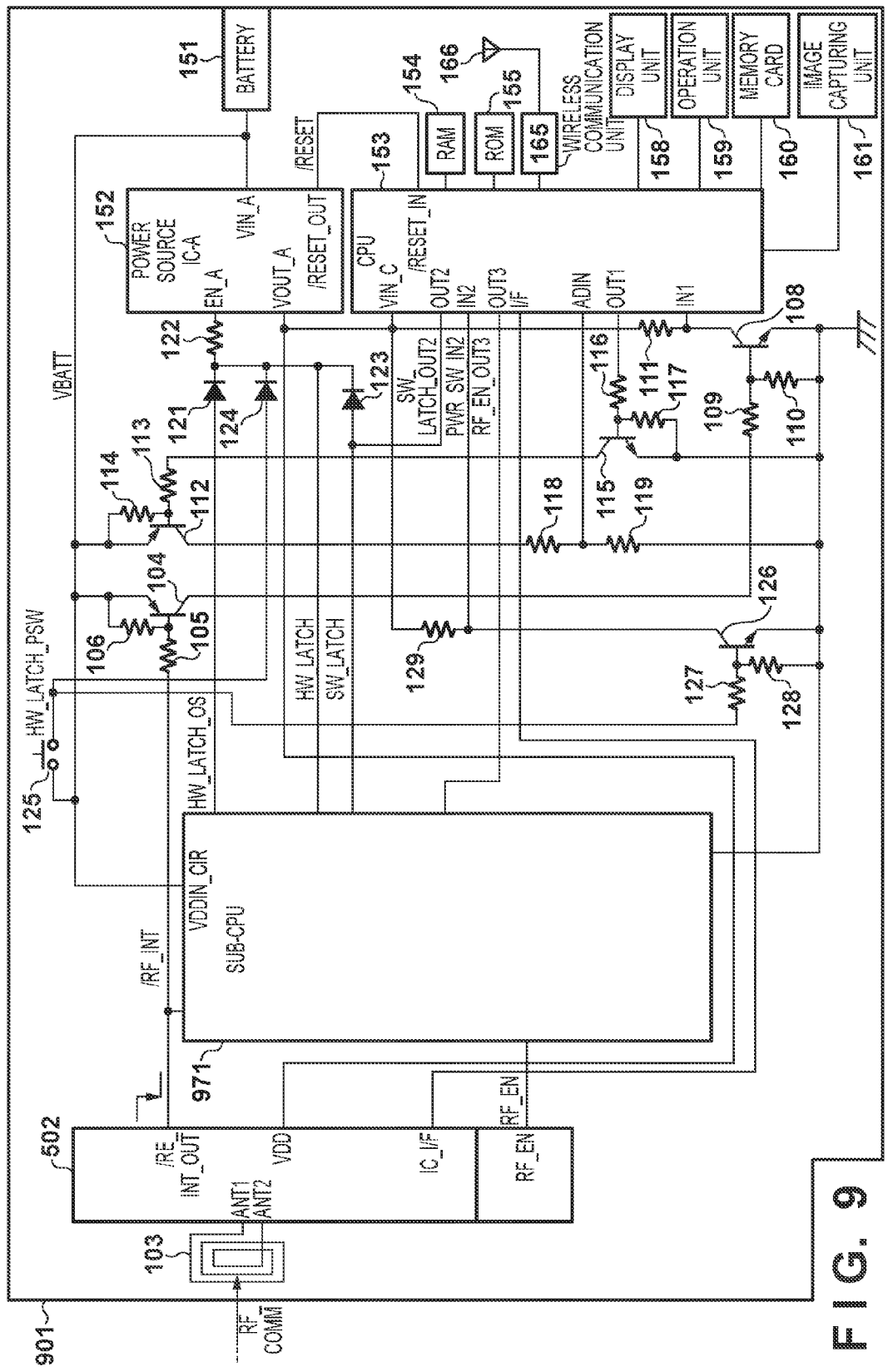
FIG. 9 is a block diagram illustrating an example of a functional configuration of a digital camera 901 according to a third embodiment.

With reference to FIG. 9, description is given regarding an example of a functional configuration of a digital camera 901 of the present embodiment. Note that operation of the SUB-CPU 971 according to the present embodiment and operation of the control circuit 571 described in the second embodiment are assumed to be equivalent seen from the CPU 153 and the contactless IC 502.

The SUB-CPU 971 is configured to obtain a power supply therefor from the voltage VBATT of the battery 151, and the power supply is always supplied when the battery 151 is present. If a supply of the power supply VDDIN_CIR of the SUB-CPU 971 is started from a state in which it is not supplied, it is assumed that logic of the SUB-CPU 971 is set to an initial state, and function is negated. In contrast, if power supply is terminated from a state in which the power supply VDDIN_CIR of the SUB-CPU 971 is being supplied, each function of the SUB-CPU 971 is negated. Consequently, in the description according to the present embodiment, description for a transient state of an unnecessary function is omitted.

A series of operations for control processing of the contactless IC 502 by the SUB-CPU 971 is similar to operations indicated in the second embodiment, and operation conditions and an example of a control procedure in accordance with the SUB-CPU 971 are as in the timing chart illustrated in FIGS. 8A-8D and the truth table illustrated in FIG. 6. In other words, it is possible to realize operation by a control circuit of the contactless IC described above by software, namely a program.

Note that configuration may be taken to realize similar functions to those in the first embodiment by configuring software of the SUB-CPU 971, a truth table, and a timing chart similarly to in the first embodiment.

In in the present embodiment as described above, the SUB-CPU 971 enables close proximity wireless communication by the contactless IC in accordance with the hardware activation signal and the software activation signal matching. In addition, configuration is taken to disable close proximity wireless communication by the contactless IC in accordance with the hardware activation signal and the software activation signal ceasing to match. In this way, it becomes possible to prevent contention of software and hardware operation states of the digital camera 901 when performing contactless wireless communication.

(Other Embodiments)

In the embodiments described above, description was given regarding an example of using a bipolar transistor as an element for performing a logic inversion and as a signal switch, for an example of configuration of a peripheral circuit of a contactless IC. However, the above switch is not limited to a bipolar transistor, and may be a unipolar transistor such as FET, for example. In other words, anything may be used if it is an element that enters a conductive state when the switch is ON, and enters a high impedance state when the switch is OFF.

In the embodiments described above, description was given regarding a configuration of using a resistor in a bias circuit, and a bipolar transistor as an element for performing a logic inversion and as a signal switch, for an example of a configuration of a peripheral circuit of a contactless IC. However, the above switch and bias circuit are not limited to a bipolar transistor and a resistor, and, for example, a FET or an IC may be combined to realize similar operation.

Note that, in the above embodiments, description was given of close proximity wireless communication of the contactless IC being assumed to conform to ISO/IEC 21481 which is an international standard. However, the wireless communication standard described above may be something other than ISO/IEC 21481. Another standard may be used if it is for a contactless IC that operates with an electromagnetic wave from an external unit as power. Regarding the frequencies of the electromagnetic wave, instead of 13.56 MHz of TSO/IEC 21481, frequencies of a kHz band to a GHz band of each part of ISO/IEC 18000 may be used.

In addition, the present invention is not limited to the above specific embodiments, and the peripheral circuits and control methods of the first to third embodiments may be appropriately combined. Whatever the embodiment, a contactless IC and a peripheral circuit are a configuration such that, when an electromagnetic wave from an external unit and a communication are received, a close proximity wireless communication operation of the contactless IC, is performed, and, triggered by this operation, a main body function of the communication apparatus performs interlink processing.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-009981, filed Jan. 21, 2016, which is hereby incorporated by reference herein in its entirety.

What is claimed is:

1. A communication apparatus comprising:
 a power supply:
 a power supply switch; and
 at least one processor or circuit to perform the operations of the following units;
 a communication unit configured to operate by using power from the power supply or a communication partner;
 a control unit configured to execute software for controlling processing of each unit of the communication apparatus, wherein the control unit starts processing to stop execution of the software if an operation to the power supply switch is started while the control unit is executing the software;
 a power supply control unit configured to control power hat is supplied to the control unit, in accordance with a state of an operation with respect to the power supply switch; and
 a disabling unit configured to disable the communication unit, based on the state of the operation with respect to the power supply switch and an execution state of the software.

2. The communication apparatus according to claim 1, wherein the disabling unit disables the communication unit if the power supply switch is in a state of being operated, and the software is in a state of not being executed.

3. The communication apparatus according to claim 1, wherein he disabling unit does not disable the communication unit if the software is in a state of being executed.

4. The communicating apparatus according to claim 1, further comprising a voltage detecting circuit, wherein the disabling unit disables the communication unit in accordance with a voltage detected by the voltage detecting circuit.

5. The communication apparatus according to claim 1, wherein, if execution of the software is stopped in accordance with the operation to the power supply switch having started, the power supply control unit starts a hardware reset of the control unit if the power supply switch is in a state of not being operated.

6. The communication apparatus according to claim 5, wherein, after the operation to the power supply switch is started, the power supply control unit does not start a hardware reset of the control unit while the power supply switch continues to be in a state of being operated.

7. The communication apparatus according to claim 1, wherein if the power supply switch transitions frond a state of not being operated to a state in which the power supply switch is being operated while the control unit is in, a state of not being supplied with power, the power supply control unit starts supply of power to the control unit.

8. The communication apparatus according to claim 7, wherein the power supply switch has a power supply button, and a state in which the power supply switch is being operated is a state in which the power supply button is being pressed.

9. The communication apparatus according to claim 1, wherein, if the communication unit receives power from the communication partner, the communication unit transmits a predetermined signal to the power supply control unit, and
 if the power control unit receives the predetermined signal from the communication unit while the control unit is in a state of not being supplied with power, h power control unit starts supply of power to the control unit.

10. A control method of a communication apparatus which comprises a power supply, a power supply switch, and at least one processor or circuit to perform the operations of the following units: a communication unit that operates by using power from the power supply or a communication partner, and a control unit, the control method comprising;
 performing, by the control unit, for executing software for controlling processing of each unit of the communication apparatus, wherein the performing starts processing to stop execution of the software if an operation to the power supply switch is started while the software is being executed;
 controlling power for supplying to the control unit, in accordance with a state of an operation with respect to the power supply switch; and
 disabling the communication unit, based on the state of the operation with respect to the power supply switch and an execution state of the software.

11. A non-transitory computer-readable storage medium storing a program for causing a computer to execute a control method of a communication apparatus which comprises a power supply, a power supply switch, and at least one processor or circuit to perform the operations of the following units; a communication unit that operates by using power from the power supply or a communication partner, and a control unit, the control method comprising:
performing, by the control unit, for executing software for controlling processing of each unit of the communication apparatus, wherein the performing starts processing to stop execution of the software if an operation to the power supply switch is started while the software is being executed;
controlling power for supplying to the control unit, in accordance with a state of an operation with respect to the power supply switch; and
disabling the communication unit, based on the state of the operation respect to the power supply switch and an execution state of the software.

* * * * *